(12) United States Patent
Sibbett et al.

(10) Patent No.: US 9,257,709 B2
(45) Date of Patent: Feb. 9, 2016

(54) PAPER-BASED FUEL CELL

(75) Inventors: Scott Sibbett, Corrales, NM (US); Carolin Lau, Cham (CH); Gustavo Pio Marchesi Krall Ciniciato, Bauru (BR); Plamen Atanassov, Santa Fe, NM (US)

(73) Assignee: STC.UNM, Albuquerque, NM (US)

( * ) Notice: Subject to any disclaimer, the term of this patent is extended or adjusted under 35 U.S.C. 154(b) by 397 days.

(21) Appl. No.: 13/997,545

(22) PCT Filed: Dec. 23, 2011

(86) PCT No.: PCT/US2011/067152
§ 371 (c)(1),
(2), (4) Date: Oct. 15, 2013

(87) PCT Pub. No.: WO2012/088503
PCT Pub. Date: Jun. 28, 2012

(65) Prior Publication Data
US 2014/0038066 A1    Feb. 6, 2014

Related U.S. Application Data

(60) Provisional application No. 61/460,037, filed on Dec. 23, 2010.

(51) Int. Cl.
H01M 8/16    (2006.01)
H01M 8/04    (2006.01)
H01M 8/00    (2006.01)
H01M 8/02    (2006.01)
H01M 8/08    (2006.01)
H01M 8/24    (2006.01)
H01M 8/10    (2006.01)

(52) U.S. Cl.
CPC .......... *H01M 8/04216* (2013.01); *H01M 8/004* (2013.01); *H01M 8/023* (2013.01); *H01M 8/0247* (2013.01); *H01M 8/0252* (2013.01); *H01M 8/08* (2013.01); *H01M 8/16* (2013.01); *H01M 8/2455* (2013.01); *H01M 8/1009* (2013.01); *Y02E 60/527* (2013.01)

(58) Field of Classification Search
CPC .................................................. H01M 8/1009
See application file for complete search history.

(56) References Cited

U.S. PATENT DOCUMENTS

| | | |
|---|---|---|
| 7,632,587 B2 | 12/2009 | McLean et al. |
| 2004/0209136 A1 | 10/2004 | Ren et al. |
| 2005/0170224 A1 | 8/2005 | Ren et al. |
| 2006/0251959 A1 | 11/2006 | Karamanev et al. |
| 2007/0184329 A1 | 8/2007 | Kim et al. |
| 2010/0035089 A1 | 2/2010 | Karamanev et al. |

*Primary Examiner* — Jane Rhee
(74) *Attorney, Agent, or Firm* — Gonzales Patent Services; Ellen M. Gonzales

(57) ABSTRACT

The present disclosure provides biological fuel cells comprising a paper-based fuel delivery layer which delivery fuel to the biological anode and cathode via capillary action and/or evaporation. In some embodiments the paper-based fuel delivery layer incorporates an outwardly extending fan-shaped region which enables a constant volumetric flow rate through the cell.

20 Claims, 5 Drawing Sheets

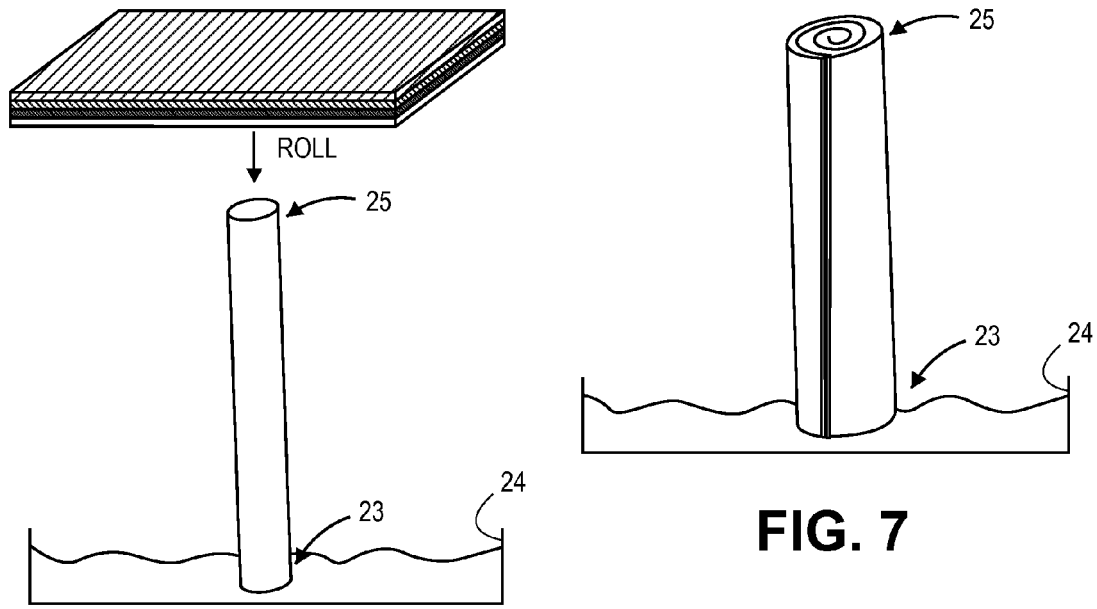
FIG. 6
FIG. 7
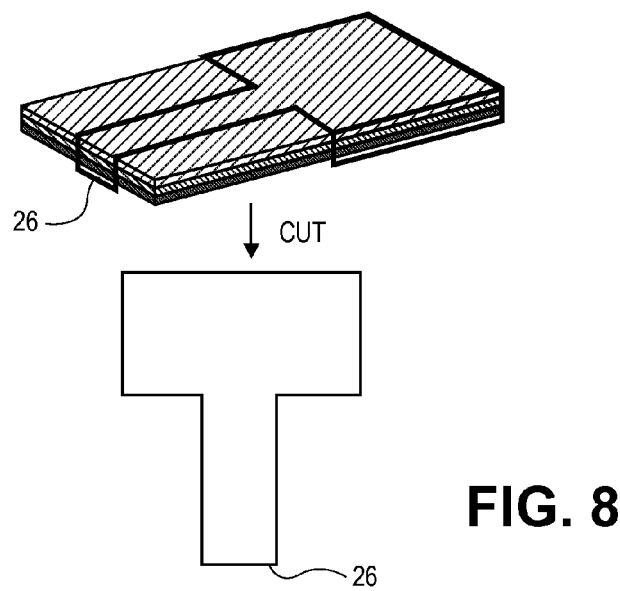
FIG. 8

PAPER-BASED FUEL CELL

CROSS-REFERENCE TO RELATED APPLICATIONS

The following application claims benefit of U.S. Provisional Application No. 61/460,037, filed Dec. 23, 2010, which is hereby incorporated by reference in its entirety.

BACKGROUND

Fuel cells provide clean and efficient mechanisms for energy production. However, both enzymatic and microbial biofuel cells are typically bulky devices containing three-dimensional voluminous fuel reservoirs and macro-scaled electrodes of different geometries. Accordingly, there remains a need for small, portable, lightweight fuel cell-based systems.

Enzyme-based fuel cells run on the same fuel as the human body, such as the glucose in Coca-Cola, but without the expense of the noble metal catalysts of conventional fuel cells, or the short shelf-life of microbial fuel cells. The design of enzymatic fuel cells today is based on over 20 years of research focused on ensuring that each liberated electron is efficiently and rapidly transferred to a solid electrode, either via electron-carrying mediators, or via direct electron transfer from enzyme to electrode. Although electron transfer is no longer a performance limiter, enzyme fuel cells remain limited in power output and lifetime, and thus are ill-suited to power practical devices such as cell phones and autonomous sensors.

The gist of the present challenge is to design cells that allow rapid transport of both fuel and oxygen to bound enzyme, and thereby circumvent the rate-limited performance of current designs. More specifically, cells must be designed to ensure an ever-present three-phase-interface between fuel, air and enzyme, a condition which is essential for each enzyme to turn over at its maximum rate.

BRIEF DESCRIPTION OF THE DRAWINGS

FIG. 6 is a schematic illustration of a multi-layered paper-based fuel cell according to a sixth exemplary embodiment wherein the stack has been rolled into a cylinder.

FIG. 7 is a schematic illustration of a multi-layered paper-based fuel cell according to a sixth exemplary embodiment wherein the stack has been rolled into a spiral.

FIG. 8 is a schematic illustration of a multi-layered paper-based fuel cell according to a fifth exemplary embodiment wherein the stack has been shaped to provide a T- or fan-shaped liquid fuel pump.

DETAILED DESCRIPTION

Figure 1:
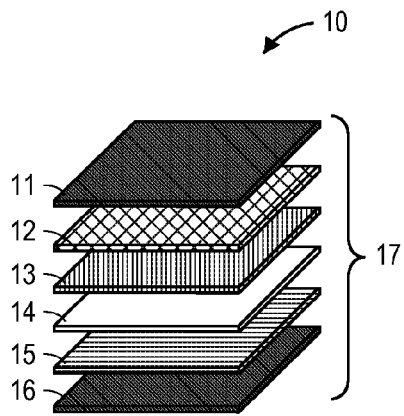
FIG. 1 is a schematic illustration of a multi-layered paper-based fuel cell according to a first exemplary embodiment of the present disclosure.

According to an embodiment the present disclosure provides a lightweight, portable paper-based fuel cell. According to various embodiments, the paper-based fuel cell is formed by stacking a series of flexible and mechanically robust thin film layers to form a single self-supporting multi-lamellar stack. According to various embodiments, the order of stacking and composition of the thin film layers depends on the intended functioning of the device. Accordingly, the various thin films may be formed from cellulose, regenerated cellulose membranes, polyester, vinyl, polystyrene, polycarbonate, polytetrafluoroethylene (PTFE, also known as Teflon® PTFE (E.I. du Pont de Nemours & Co., Wilmington Del.)), nitrocellulose, polydimethylsiloxane (silicone rubber) Nafion, Tegaderm, Toray paper, Buckeye paper, and chemically-functionalized variants of all the above-named thin films including functionalization with carbon-nanotubes, carbon-black, graphite, and enzyme.

As explained in further detail below, the paper-based fuel cell will typically include a paper-based layer that serves as a fuel delivery mechanism that delivers fuel to the cathode and anode portions of the fuel cell via capillary action and/or evaporation. For the purposes of the present disclosure, the term "paper" is a generic term that refers to any structurally-flexible thin film element. Such an element is usually but not always formed of porous cellulose and/or pressed cellulosic fibers, carbon fibers or fibers of a carbonaceous materials such as carbon nanotube (CNT) and composite materials comprising of fibers of cellulose and/or carbonaceous materials and other carbonaceous materials such as carbon blacks and polymer materials that are associated with the cellulose and/or carbonaceous component of the composite.

In the present disclosure, we additionally refer to as "paper" the structurally-flexible thin film elements fabricated of the following materials: regenerated cellulose membranes, polyester, vinyl, polystyrene, polycarbonate, polytetrafluoroethylene, nitrocellulose, polydimethylsiloxane (silicone rubber) Nafion, Tegaderm, Toray paper, Buckeye paper, and chemically-functionalized variants of all the above-named thin films including functionalization with carbon-nanotube, carbon-black, graphite, and enzyme.

The fuel cell of the present disclosure typically includes biological anode and cathode components. Accordingly, in some embodiments enzymes or other microorganisms capable of catalyzing the cathode and anode fuel cell processes are deposited or otherwise incorporated into individual thin films so as to form separate layers in the fuel cell, while still maintaining fluidic contact with the fuel delivery layer(s) when fuel is traveling through the fuel delivery layer(s). In other embodiments, the enzymes or microorganisms are deposited on or otherwise incorporated into the fuel delivery layer. Suitable cathode enzymes include, but are not limited to oxygen-reducing multicopper oxidases such as laccase, including bacterial (small) laccases, ascorbate oxidase or bilirubin oxidase. Suitable anode enzymes include, but are not limited to NADH-dependent enzymes such as glucose dehydrogenase (GDH), alcohol dehydrogenase (ADH) aldol dehydrogenase (AlDH) and other enzymes of the class of dehydrogenases, such as PQQ-dependent glucose dehydrogenase (PQQ-GDH), alcohol dehydrogenase (PQQ-ADH) aldol dehydrogenase (PQQ-AlDH), oxidase enzymes such as glucose oxidase (GOx), lactate oxidase (LOx), alcohol oxidase (AOx), and microorganisms that can be integrated in electrodes to oxidize fuels such as *Shewanella* sp. and *Geobacter* sp.

Turning to FIG. 1, a first exemplary embodiment is shown. Fuel cell 10 is comprised of multiple layers of thin films, with each layer serving a specific purpose in the fuel cell. Fuel cell 10 includes a first layer 11, which is an electrically non-conductive and liquid-and gas impermeable thin film. Layer 11 may be formed from, for example, a thermoplastic such as polyvinyl acetate or PTFE. Layer 12 is a cathode layer which may be formed from, for example, an absorbent paper on which one or more types of oxygen-reducing enzymes or microorganisms is deposited. Layer 13 is a first fuel delivery layer (which may also be referred to herein as a wicking layer). Layer 13 may be an electrically-non-conductive porous thin film formed from, for example, nitrocellulose membrane, or paper, through which an organic liquid (i.e. fuel) with or without a buffer is able to flow via capillary action. An ionomeric layer 14 may further act as an optional separator and may be formed from a porous medium that is infused with a mobile electrolyte, thus also acting as a second fuel delivery layer. Fuel cell 10 further includes an anode layer 15 which may be formed from, for example, an absorbent paper on which one or more types of oxidative enzymes or microorganisms is deposited. Finally, layer 16 is another electrically non-conductive and liquid-and gas impermeable thin film, which again may be formed from, for example, a thermoplastic such as polyvinyl acetate or PTFE. For the purposes of the present disclosure, the various layers are referred to in combination as a fuel cell stack, or simply stack, as indicated by reference numeral 17.

It should be noted that the various layers, even if they serve similar functions, may be formed from the same or different basic materials. For example, layer 11 may be formed from polyvinyl acetate while layer 16 may be formed from PTFE. Similarly, cathode layer 12 may be formed from cathode enzymes deposited on Toray paper while anode layer 15 may be formed from anode enzymes deposited on Buckeye paper. It should be further understood that one or more of the layers described with reference to FIG. 1 may be combined or omitted, as desired or as best serves the purpose(s) of the fuel cell being designed. For example, fuel cell 10 may be formed without one or both of the electrically non-conductive and liquid- and gas-impermeable thin film layers 11 and 16. Alternatively, an embodiment of fuel cell 10 may include a cathode layer that is simultaneously ionomeric and does not provide for gaseous diffusion. In one embodiment the cell can be designed to operate entirely submersed in aqueous media (electrolyte, bodily fluid, sampling fluid or environmental fluid). This will allow extraction of power from such fluids for the purpose of energy harvesting from the components of the fluids or sensing of the species present in them. Other possible configurations include, but are not limited to, those where the layers are arranged cathode layer/fuel delivery layer/ionomeric membrane/anode layer (with or without one or both of the non-conductive/impermeable outer layers), which can be advantageous in cases when a phenomena such as crossover or parasitic currents may hinder the energy harvesting process. In a yet another embodiment cathode layer/ionomeric membrane/anode layer/fuel delivery layer can be formed and practiced as a simple, open to the air, energy harvesting system as the fuel cell cathode is operated in air breathing gas-diffusion mode, thus harvesting oxygen from the ambient air.

Figure 2:
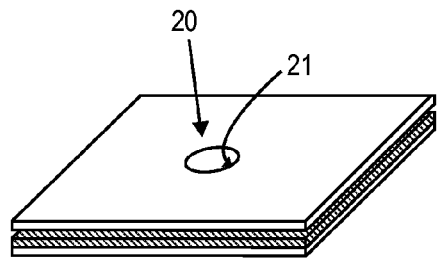
FIG. 2 is a schematic illustration of an exemplary fuel cell stack including a via at the center point through which fuel may be introduced to the fuel delivery layer.

According to an embodiment, and as shown in FIG. 2, fuel may be introduced to the unwetted fuel delivery layer(s) of a fuel cell stack at center point 20. The center point may be made accessible by fabrication of a via 21 at the center point through all overlying layers. Fuel flow can then occur radially from the point of introduction by capillary action, evaporation, or a combination of the two.

Figure 3:
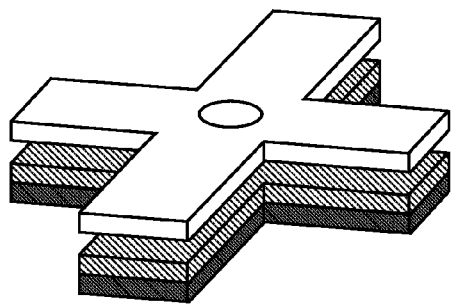
FIG. 3 is a schematic illustration of a multi-layered paper-based fuel cell according to a second exemplary embodiment of the present disclosure.

A still further embodiment is shown in FIG. 3. According to some embodiments it may be desirable to shape the fuel cell to include multiple appendages that extend outward from the fuel delivery layer. The appendages act as a capillary pump that pulls the fuel-containing liquid through the active zone of the fuel cell anode. The appendages may be fully or partially laminated, to prevent or reduce evaporation. Alternatively, if no lamination is used, evaporative action will contribute to the movement of the liquid through the fuel delivery layer and appendages, producing a constant driving force for the fuel-carrying liquid through the cell. Whether or not evaporation is allowed, there is no electrical energy diverted to operate the flow in the fuel cell and the cell thus operates solely in a high efficiency, passive flow-through mode. Accordingly, the entire power produced can be harvested for useful work in an external electric circuit.

Figure 4:
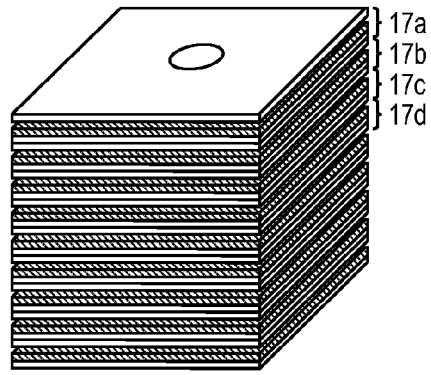
FIG. 4 is a schematic illustration of a multi-layered paper-based fuel cell according to a third exemplary embodiment wherein a plurality of individual stacks are assembled to form a stack of stacks.
Figure 5:
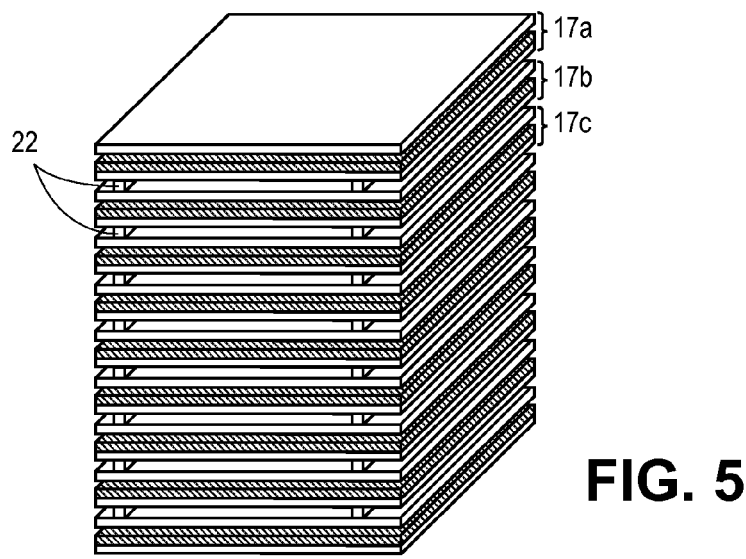
FIG. 5 is a schematic illustration of a multi-layered paper-based fuel cell according to a fourth exemplary embodiment wherein a stack of stacks employs spacers between individual stacks.

According to some embodiments, it may be desirable to join a plurality of stacks, connected in series, to form a stack of stacks as shown in FIG. 4. In this embodiment, a single center via 21 may provide a pathway for fluidic interconnection of all the individual devices 17a, 17b, 17c, etc. As shown in FIG. 5, spacers 22 may be placed between each of the individual stacks in order to enhance the direct diffusion of ambient oxygen to the anodes.

Alternatively, according to some embodiments it may be preferable or desirable to dip one end of the fuel cell into a fuel reservoir to allow fuel to travel from a first proximal end of the stack to a distal end of the stack. As with the previously described embodiments, travel of the fuel through the fuel cell may be via capillary action, evaporation, or a combination of the two. According to some embodiments, it may be desirable to roll the stack into a cylinder or spiral formation, as shown in FIGS. 6 and 7, respectively, such that proximal end 23 of fuel cell 10 can be dipped into reservoir 24, thus allowing for fuel to travel towards distal end 25.

Figure 9B:
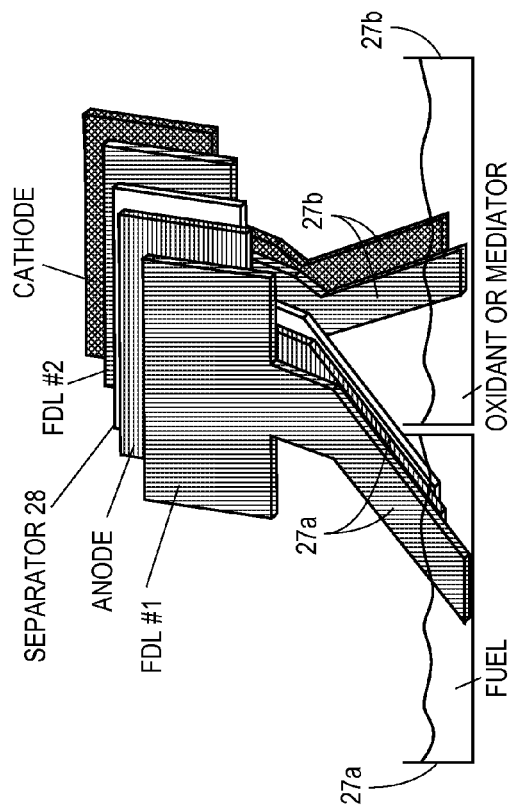
FIG. 9b is a schematic illustration of another variant of the fifth exemplary embodiment wherein the stack includes two fuel delivery layers and each fuel delivery layer can be dipped into a separate reservoir.
Figure 9A:
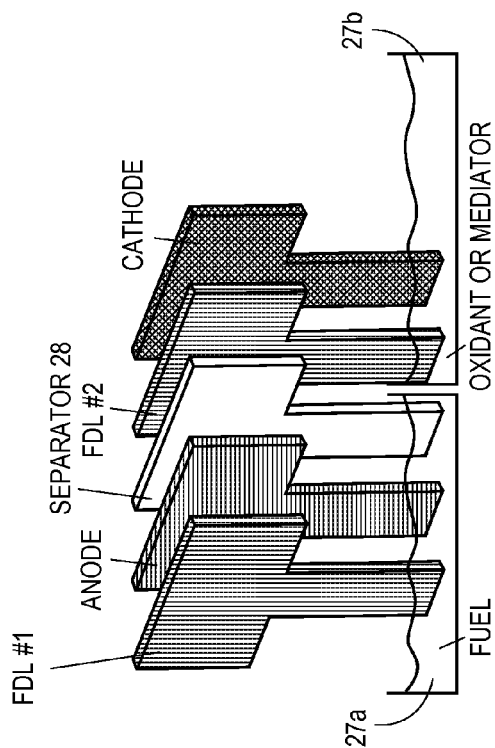
FIG. 9a is a schematic illustration of a variant of the fifth exemplary embodiment wherein the stack includes two fuel delivery layers and each fuel delivery layer can be dipped into a separate reservoir.

According to various embodiments it may be useful or desirable to impart a two-dimensional shape to the fuel cell stack. For example, a T-shaped stack, as shown in FIG. 8 provides a leg 26, which can then be dipped into a reservoir. Alternatively, as shown in FIGS. 9a and 9b, in embodiments wherein the stack includes more than one fuel delivery layer, where each fuel delivery layer is positioned to deliver fluid to a separate side of the fuel cell (i.e. the cathode and anode sides, respectively), each leg 26a and 26b may be dipped into two separate reservoirs, 27a and 27b. As shown, the fuel deliver layers and respective anode and cathode sides are separated by a separating layer 28. In this embodiment, the reservoirs may contain different fluids. For example, leg 26a may be positioned to deliver fluid to the anode side of the fuel cell and reservoir 27a may accordingly contain liquid fuel. A second fuel delivery leg 26b may be positioned to deliver fluid to the cathode side of the fuel cell and thus reservoir 27b may contain a chemical oxidant or mediator, to establish a co-flow. Of course it will be appreciated that the stack is not necessarily limited to only one or two legs or appendages and that any number of appendages may be utilized, wherein each appendage is exposed to the same or a different, or no, liquid at the same or different times. Furthermore, as shown in comparing FIGS. 9a and 9b, the legs may be shaped to include differentiating bends or curvatures that enable easier access to the different reservoirs.

Figure 11:
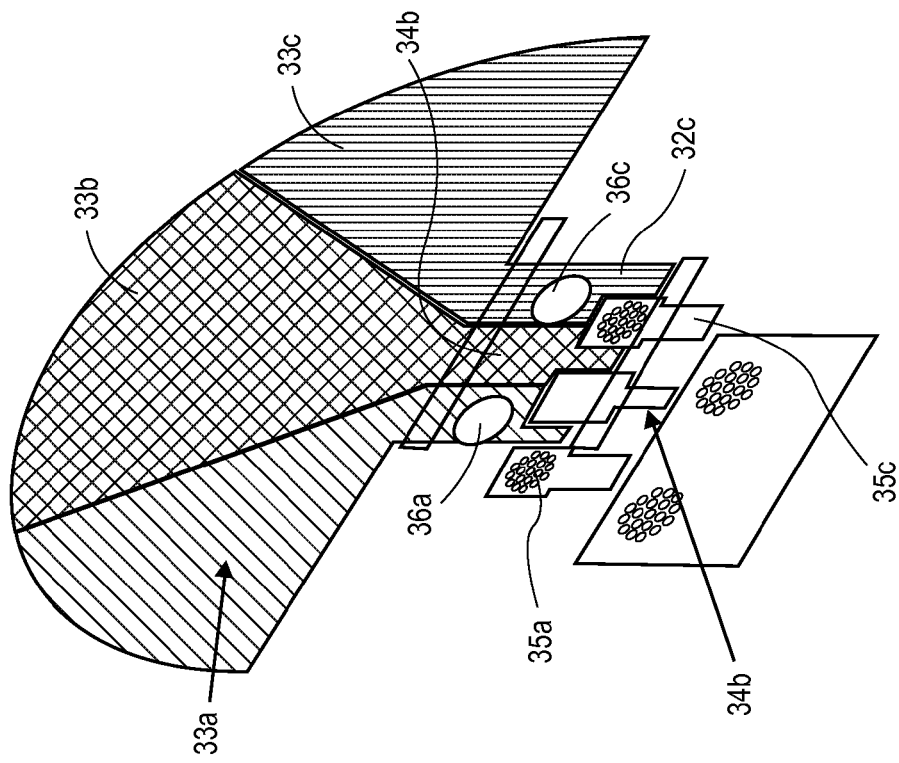
FIG. 11 is a schematic illustration of a paper-based fuel cell comprising multiplexed cells connected in series.
Figure 10:
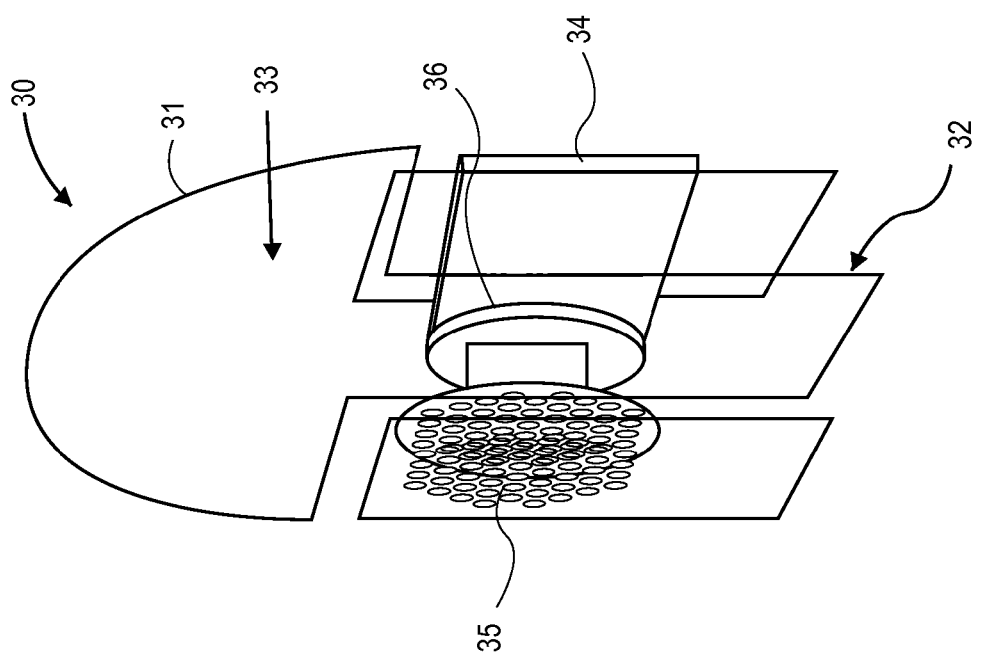
FIG. 10 is a schematic illustration of a sixth exemplary embodiment wherein the cathode and anode enzymes are deposited on opposite sides of a fan-shaped fuel delivery layer.

According to various embodiments, the shape of the fuel delivery layer may be altered in order to improve or more finely control the movement of the liquid through the fuel delivery layer. Turning now to FIGS. 10 and 11, yet another embodiment of a paper-based fuel cell according to the present disclosure is shown, wherein the fuel delivery layer is specifically shaped to produce a constant velocity pump within the system. In this embodiment, fuel cell 30 includes fuel delivery layer 31 including one or more rectangular portions 32 which extend from the proximal end of an outwardly radiating fan-shaped portion 33. (FIG. 10 depicts an embodiment including a single rectangular portion while FIG. 11 depicts an embodiment with multiple rectangular portions.)

The velocity of the fluid drawn by capillary action in the rectangular segment decreases as 1/x as governed by the Lucas-Washburne law. However, once the fluid front reaches the outwardly radiating fan-shaped portion of the paper, the velocity of the fluid becomes constant due to constant expansion of the fluid front in the fan-shaped portion. If the fan-shaped portion is uncovered, and thereby exposed directly to ambient air, evaporation of fluid adds to the capillary force pulling fluid from the reservoir. Given enough time of imbibition, evaporation eventually becomes the sole driving force. In all events, a constant volumetric flow rate is obtained in the rectangular segment, with the rate of flow being increased or decreased by the degree of "openness" of the fan-shaped portion (i.e. a larger, more open fan would have a slower rate of flow while a smaller, more closed fan would have a faster rate of flow). Accordingly, it is possible to control the rate of flow through the rectangular segment by selecting the specific shape of the fan-shaped segment. Furthermore, because the fan-shaped portion is made of paper, the shape, and thus, rate of flow can be controlled by the user before or during use simply by tear or cutting the outer edges of the fan-shaped portion.

Returning to FIG. 10, as shown, an anode 34 and a cathode 35 are each positioned on the rectangular section 32, such that the fan-shaped portion 33 extends past the anode and cathode. According to an exemplary embodiment, the cathode and anode regions may be formed by depositing and adsorbing cathode enzymes on one side of the rectangular portion of the fuel delivery paper and anode enzymes on the other side to form a reaction zone 36. In this embodiment, the size and shape of the reaction zone is defined by the region of enzyme deposition. Accordingly, the dimensions of the reaction zone can be specifically selected for the specific purpose of the fuel cell. For example, the reaction zone could have macroscale dimensions in the x and y direction, and microscale dimensions on the z direction. In this embodiment, the cathode reaction zone may be uncovered, covered with an oxygen-permeable cover (such as oxygen-permeable tape), or partially covered (for example, with oxygen-impermeable tape), as shown by tape 37, which includes orifices 38, through which ambient air can interact with cathode 35. Whichever configuration is selected, if it is desirable, as it typically is, that oxygen not limit the rate of enzyme turnover, the cathode reaction zone should be sufficiently exposed to ambient air (or some other oxygen source) so as to enable a sufficient supply of oxygen to diffuse directly to the reaction zone in the z direction.

According to a specific example of this embodiment, a cathode was fabricated by pressing tefonlized carbon black (35 wt % PTFE) on perforated Toray® paper. The perforations were generated by a computer-controlled knife cutter. The Toray paper served to collect the current and provide mechanical stability. The cathode enzyme bilirubin oxidase was immobilized on the carbon black by adsorption. When adsorbed on an electrode, the oxidase transfers 4 electrons from the electrode directly to oxygen. This process occurs at a redox potential close to the ideal thermodynamic potential of 1.2V versus NHE at pH 7. Inclusion of the carbon black enhances oxygen diffusion to the enzyme. An anode was fabricated by immobilizing NADH-dependent glucose dehydrogenase (GDH, 1 wt % chitosan) onto multi-walled carbon nanotube (MWCNT) paper by co-casting with a chitosan solution (1% in acetic acid). To enable the reversible regeneration of NAD+ to NADH, the mediator polymethylene green was directly electropolymerized on the MWCNT prior to co-casting. The fuel cell was assembled by affixing the cathode and anode reaction zones to opposite sides of the handle portion of a fan-shaped piece of filter paper (Whatman CR1) with adhesive tape. In this embodiment, the filter papers serve as the fuel delivery system, creating a continuous supply of fuel by capillary and/or evaporation-driven pumping, separate the cathode and anode, and provide mechanical stability.

Figure 12:
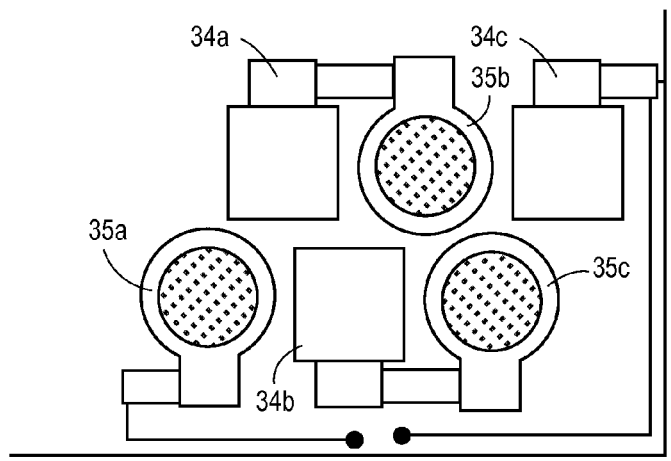
FIG. 12 shows an exemplary circuit scheme for the fuel cell of FIG. 11.

As mentioned above and as shown in FIG. 11, the embodiment shown in FIG. 10 may be further enhanced by multiplexing multiple reaction zones by attaching multiple anodes and cathodes in series to multiple rectangular sections extending from the same fan-shaped paper. FIG. 12 shows an exemplary circuit scheme for the three reaction zone cell shown in FIG. 11. Of course it will be understood that a multiplexed fuel cell could be formed with any number of cells.

It will be appreciated that while each of the embodiments described above is described separately, the present disclosure contemplates any number of combinations and sub-combinations of the above-described embodiment elements. For example, one or more fan-shaped fuel delivery layers described with respect to FIGS. 10 and 11 may be combined with any of the multi-layered embodiments shown in FIGS. 1-9 and any of the layers shown in FIGS. 1-9 may be combined with any of the elements shown in FIGS. 10 and 11. Accordingly, three-dimensionally multi-plexed fuel cells incorporating two or more stacks of the horizontally multi-plexed cells shown in FIGS. 10 and 11 are also contemplated.

Electrical current may be extracted from any of the fuel cell configurations described above by contacting conductive electrodes with the cathodic and anodic films or reaction zones described above. The electrodes may be composed of, for example, conductive wires or conductive ink. For example, in the embodiment depicted in FIGS. 10 and 11, the carbonaceous papers of both the cathode and anode were shaped to form appendages, which served as electrically conductive macroscale contacts, to which banana clips were attached.

Figure 13:
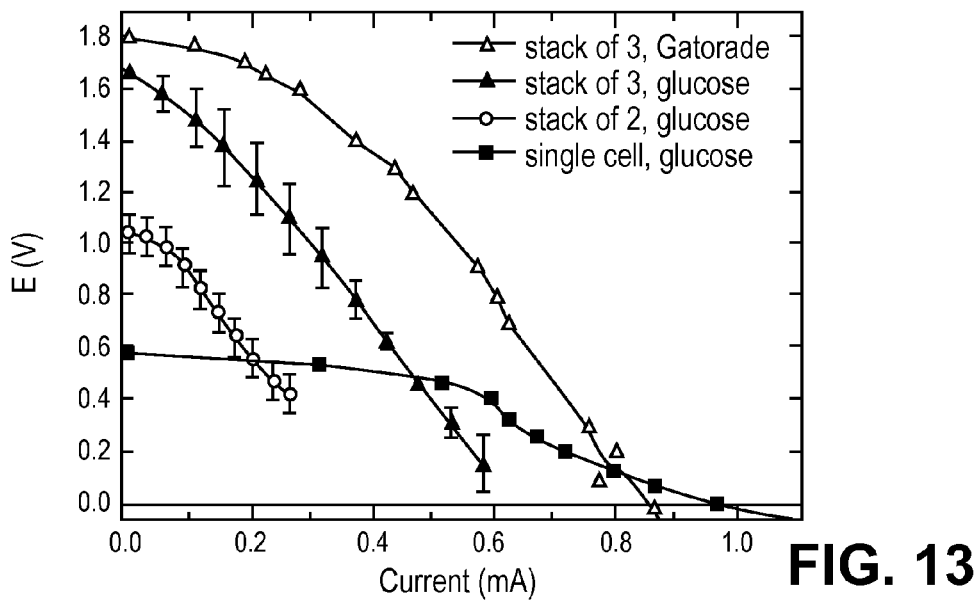
FIG. 13 shows the polarization curves of single cell, stack of two, and stack of three cells in series using 0.1 M glucose, 0.1M Phosphate Buffer Solution (PBS), 50 mM solution of $NAD^+$ (introduces as Na salt), 1M KCL, pH 7.3, or in Gatorade 90.1M PBS pH 7, 50 mM $NAD^+$).
Figure 14:
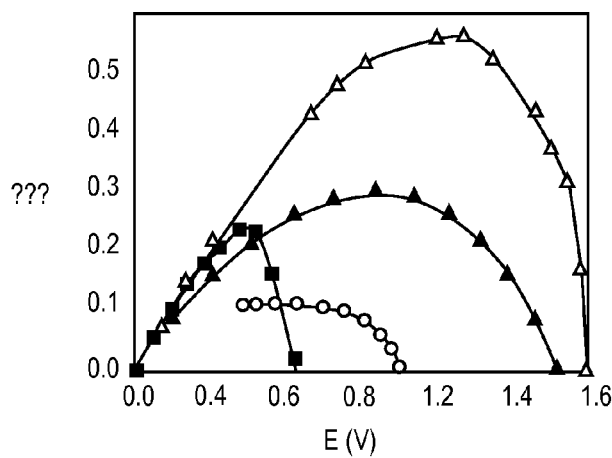
FIG. 14 shows the power curves corresponding to FIG. 12.

Single, double, and triple celled versions of single fuel delivery layer fan-shaped embodiments were fabricated and tested. As expected, the open circuit cell voltages behaved in a nearly additive fashion with approximately 0.62 V, 1006V and 1.67 V for single, double, and triple cells, respectively. Testing showed that the resistivity between two electrodes is about 2-3 $\Omega$/cm. To avoid a loss through shunt currents, in the multi-plexed embodiments, the cells were separated by gaps between the rectangular portions and each rectangular portion was exposed to an individual fuel reservoirs. FIG. 13 shows the polarization curves of single cell, stack of two, and stack of three cells in series using 0.1 M glucose, 0.1M PB, 50 mM NAD+, 1M KCL, pH 7.3, or in Gatorade 90.1M PB pH 7, 50 mM NAD+). FIG. 14 shows the power curves corresponding to FIG. 12. The three celled embodiment was able to power a 1.8V digital clock for 9 hours and was able to produce detectable power for 24 continuous hours using an off-the-shelf Gatorade beverage as the fuel source. Furthermore, under laboratory conditions, it was possible to maintain a voltage of 400 mV at 1.7 k$\Omega$ load for a single cell for 6 days.

It will be appreciated that the present disclosure provides small, light-weight, portable fuel cells which are able to use "fuels of opportunity" such as sports drinks, alcoholic beverages like vodka, sodas, or any other liquid containing sugars. Accordingly, the fuel cells of the present disclosure may provide a simple, yet effective, mechanism for an emergency electricity supply. The embodiment shown in FIGS. 10 and 11, for example, can comprise a reaction area no larger than a credit card and fan-shaped fuel delivery paper can be folded without affecting its effectiveness. Accordingly, the entire fuel cell could be packaged to fit inside a wallet and saved for use as an emergency mechanism for powering up a cell phone or other device. Furthermore, as described above, electrodes can be formed from graphite or other electrically conductive inks making the entire device biodegradable.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a host cell" includes a plurality (for example, a culture or population) of such host cells, and so forth.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

REFERENCES

1. G. Tayhas, R. Palmore, G. M. Whitesides, Microbial and Enzymatic Biofuel Cells. ACS symposium series. 566, 271 (1994).
2. T. Chen et al., A Miniature Biofuel Cell. JACS 123, 8630 (2001).
3. E. Katz, I. Willner, A biofuel cell with electrochemically switchable and tunable power output. JACS 125, 6803 (2003).
4. A. Heller, Miniature biofuel cells. PCCP 6, 209 (2004).
5. P. Atanasov et al., Enzymatic Biofuel Cells. Electrochem. Soc. Interface, (2007).
6. F. Davis, S. P. J. Higson, Biofuel cells—Recent advances and applications. Biosens. Bioelectron. 22, 1224 (2007).
7. M. J. Cooney, V. Svoboda, C. Lau, G. Martin, S. D. Minteer, Review: Enzyme catalysed biofuel cells. Energy Environ. Sci. 1, 320 (2008).
8. D. Ivnitski et al., Entrapment of enzymes and carbon nanotubes in biologically synthesized silica: Glucose oxidase-catalyzed direct electron transfer. Small 4, 357 (March 2008).
9. N. Mano, A 280 microW cm-2 biofuel cell operating at low glucose concentration. Chem. Comm 2008, 2221 (2008).
10. R. L. Arechederra, S. D. Minteer, Complete Oxidation of Glycerol in an Enzymatic Biofuel Cell. Fuel Cells 9, 63 (2009).
11. H. Kumita et al., Improvement in the durability of the Sony's biofuel cell. Preprints of Symposia—American Chemical Society, Division of Fuel Chemistry 54, 983 (2009).
12. H. Sakai et al., A high-power glucose/oxygen biofuel cell operating under quiescent conditions. Energy Environ. Sci. 2, 133 (2009).
13. L. Stoica et al., Membrane-Less Biofuel Cell Based on Cellobiose Dehydrogenase (Anode)/Laccase (Cathode) Wired via Specific Os-Redox Polymers. Fuel Cells 9, 53 (2009).
14. I. Willner, Y. M. Yan, B. Willner, R. Tel-Vered, Integrated Enzyme-Based Biofuel Cells-A Review. Fuel Cells 9, 7 (2009).
15. P. Brito, A. Turner, Mediated Biocatalytic Electrodes and Enzyme Stabilisation for Power Generation. Electroanal. 22, 732 (2010).

16. W. Gellett, M. Kesmez, J. Schumacher, N. Akers, S. Minteer, Biofuel Cells for Portable Power. Electroanal. 22, 727 (2010).
17. E. Katz, Biofuel Cells with Switchable Power Output. Electroanal. 22, 744 (2010).
18. C. Tanne, G. Goebel, F. Lisdat, Development of a (PQQ)-GDH-anode based on MWCNT-modified gold and its application in a glucose/O(2)-biofuel cell. Biosens Bioelectron 26, 530 (Oct. 15, 2010).
19. R. A. Rincón, C. Lau, K. E. Garcia, P. Atanassov, Flow-through 3D biofuel cell anode for NAD+-dependent enzymes. Electrochim Acta 56, 2503 (2011).
20. A. Zebda et al., Mediatorless high-power glucose biofuel cells based on compressed carbon nanotube-enzyme electrodes. Nat Commun 2, 370 (2011).
21. M. H. Osman, A. A. Shah, F. C. Walsh, Recent progress and continuing challenges in bio-fuel cells. Part I: Enzymatic cells. Biosens. Bioelectron. 26, 3087 (Mar. 15, 2011).
22. M. H. Osman, A. A. Shah, F. C. Walsh, Recent progress and continuing challenges in bio-fuel cells. Part II: Microbial. Biosens. Bioelectron. 26, 953 (Nov. 15, 2010).
23. Z. H. Dai, F. X. Liu, G. F. Lu, J. C. Bao, Electrocatalytic detection of NADH and ethanol at glassy carbon electrode modified with electropolymerized films from methylene green. J. Solid State Electrochem. 12, 175 (2008).
24. A. A. Karyakin, Prussian Blue and its analogues: electrochemistry and analytical applications. Electroanal. 13, 813 (2001).
25. A. A. Karyakin, E. E. Karyakina, W. Schuhmann, H.-L. Schmidt, Electropolymerized azines. Part 2. In a search of the best electrocatalyst of NADH oxidation. Electroanal. 11, 553 (1999).
26. R. Rincón et al., Structure and Electrochemical Properties of Electrocatalysts for NADH Oxidation. Electroanal. 22, 799 (2010).
27. A. E. Blackwell, M. J. Moehlenbrock, J. R. Worsham, S. D. Minteer, Comparison of Electropolymerized Thiazine Dyes as an Electrocatalyst in Enzymatic Biofuel Cells and Self Powered Sensors. J. Nanosci. Nanotech. 9, 1714 (2009).
28. C. W. N. Villarrubia, R. A. Rincon, V. K. Radhakrishnan, V. Davis, P. Atanassov, Methylene Green Electrodeposited on SWNTs-Based "Bucky" Papers for NADH and L-Malate Oxidation. Acs Appl Mater Inter 3, 2402 (July, 2011).
29. F. Xu et al., A study of a series of recombinant fungal laccases and bilirubin oxidase that exhibit significant differences in redox potential, substrate specificity, and stability. Biochim. Biophys. Acta 1292, 303 (1996).
30. G. Gupta et al., Direct electron transfer catalyzed by bilirubin oxidase for air breathing gas-diffusion electrodes. Electrochem. Commun. 13, 247 (2011).

What is claimed is:

1. A fuel cell comprising:
at least one paper-based fuel delivery layer (FDL), wherein liquid fuel is able to travel through the FDL via capillary action and/or evaporation;
a biological cathode in communication with the FDL, wherein the biological cathode is in fluidic communication with the FDL when fuel is traveling through the FDL;
a biological anode in communication with the FDL, wherein the biological anode is in fluidic communication with the FDL when fuel is traveling through the fuel delivery layer;
wherein the FDL is positioned between the biological cathode and biological anode.

2. The fuel cell of claim 1 wherein the FDL comprises at least one rectangular portion and a fan-shaped portion extending from the proximal end of an outwardly radiating fan-shaped portion wherein the biological anode and cathode are each adjacent to, but positioned on opposite sides of, the rectangular portion.

3. The fuel cell of claim 2 further comprising multiple rectangular portions extending from the proximal end of the outwardly radiating fan-shaped portion and wherein each rectangular portion comprises a biological anode and cathode that are each adjacent to, but positioned on opposite sides of, the corresponding rectangular portion to produce a multi-celled fuel cell.

4. The fuel cell of claim 3 wherein the individual cells in the multi-celled fuel cell are connected in series.

5. The fuel cell of claim 2 further including electrically conductive contacts extending from the biological anode and biological cathode.

6. The fuel cell of claim 5 wherein the electrically conductive contacts are formed from graphite ink.

7. The fuel cell of claim 1 wherein the entire fuel cell is biodegradable.

8. The fuel cell of claim 1 wherein the cathode comprises cathodic enzymes immobilized on carbon black.

9. The fuel cell of claim 8 wherein the carbon black is teflonized.

10. The fuel cell of claim 9 wherein the teflonized carbon black is pressed on to a paper substrate.

11. The fuel cell of claim 1 wherein the cathodic enzymes are selected from the group consisting of laccase, ascorbate oxidase and bilirubin oxidase.

12. The fuel cell of claim 1 wherein anode comprises anodic enzymes immobilized on multi-walled carbon nanotube paper.

13. The fuel cell of claim 12 wherein the anodic enzymes are NADH-dependent glucose dehydrogenase.

14. The fuel cell of claim 1 wherein the region of the rectangular portion of the FDL that is in communication with the biological cathode and anode forms a reaction region and the reaction region has macroscale dimensions in the x and y direction and microscale dimensions in the z direction.

15. The fuel cell of claim 1 wherein the biological cathode comprises one or more enzymes or microorganisms deposited on a first thin film and the biological anode comprises one or more enzymes or microorganism deposited on a second thin film.

16. The fuel cell of claim 5 wherein the first and second thin films have a footprint identical to the footprint of the FDL, and the films and FDL are layered in a planar fashion to form a stack.

17. The fuel cell of claim 15 wherein the stack comprises a via in one or more layers that provides fluidic access to the FDL.

18. The fuel cell of claim 15 further comprising an ionomeric layer.

19. The fuel cell of claim 16 wherein the stack comprises a leg segment that extends outward.

20. A method for delivering electricity to a device comprising:
providing a fuel cell comprising:
at least one paper-based fuel delivery layer (FDL), wherein liquid fuel is able to travel through the FDL via capillary action and/or evaporation;

a biological cathode in communication with the FDL, wherein the biological cathode is in fluidic communication with the FDL when fuel is traveling through the FDL;

a biological anode in communication with the FDL, wherein the biological anode is in fluidic communication with the FDL when fuel is traveling through the fuel delivery layer; and electrically conductive contacts in electrical communication with the biological cathode and biological anode, placing the device in electrical communication with the electrically conductive contacts; and exposing the FDL to a sugar-containing liquid.

* * * * *